United States Patent
Wu

(10) Patent No.: US 10,634,956 B2
(45) Date of Patent: Apr. 28, 2020

(54) DISPLAY PANEL AND DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventor: Xiaoxiao Wu, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/429,378

(22) Filed: Feb. 10, 2017

(65) Prior Publication Data
US 2017/0153483 A1 Jun. 1, 2017

(30) Foreign Application Priority Data
Oct. 24, 2016 (CN) .......................... 2016 1 0925816

(51) Int. Cl.
| | | |
|---|---|---|
| G02F 1/1339 | (2006.01) | |
| G02F 1/1335 | (2006.01) | |
| G02F 1/1343 | (2006.01) | |

(52) U.S. Cl.
CPC .... *G02F 1/13394* (2013.01); *G02F 1/133512* (2013.01); *G02F 2001/13396* (2013.01); *G02F 2001/134345* (2013.01)

(58) Field of Classification Search
CPC .................. G02F 1/13394; G02F 2001/13396
See application file for complete search history.

(56) References Cited

U.S. PATENT DOCUMENTS

| | | | | |
|---|---|---|---|---|
| 10,180,601 B2 * | 1/2019 | Zhang | ...................... | G09G 3/36 |
| 2009/0109382 A1 * | 4/2009 | Sawasaki | ............ | G02F 1/13394 |
| | | | | 349/106 |
| 2012/0314163 A1 * | 12/2012 | Joo | ..................... | G02F 1/13394 |
| | | | | 349/106 |
| 2014/0036189 A1 | 2/2014 | Yi et al. | | |
| 2017/0090233 A1 * | 3/2017 | Xu | ...................... | G02F 1/13394 |
| 2017/0139255 A1 * | 5/2017 | Wu | ..................... | G02F 1/13394 |

FOREIGN PATENT DOCUMENTS

| | | | |
|---|---|---|---|
| CN | 1873488 A | | 12/2006 |
| CN | 100447627 C | | 12/2008 |
| CN | 102955297 A | | 3/2013 |
| CN | 104317111 A | * | 1/2015 |
| CN | 104317111 A | | 1/2015 |
| CN | 104730762 A | | 6/2015 |
| CN | 204705801 U | | 10/2015 |
| CN | 105652527 A | | 6/2016 |

* cited by examiner

*Primary Examiner* — Jessica M Merlin
(74) *Attorney, Agent, or Firm* — Anova Law Group PLLC

(57) ABSTRACT

A display panel and a display panel are provided. The display panel comprises an array substrate having an inner surface disposed with at least one first hole; a color film substrate arranged opposite to the array substrate; and a first photo spacer disposed between the array substrate and the color film substrate. The inner surface of the array substrate is arranged facing an inner surface of the color film substrate, and the first photo spacer is at least partially inserted into the at least one first hole disposed at the inner surface of the array substrate.

16 Claims, 7 Drawing Sheets

DISPLAY PANEL AND DISPLAY DEVICE

CROSS-REFERENCES TO RELATED APPLICATIONS

This application claims priority of Chinese Patent Application No. 201610925816.4, filed on Oct. 24, 2016, the entire contents of which are hereby incorporated by reference.

FIELD OF THE INVENTION

The present disclosure generally relates to the field of display technology and, more particularly, relates to a display panel and a display device thereof.

BACKGROUND

With the development of optical technology and semiconductor technology, flat panel display devices, such as liquid crystal display (LCD) and organic light-emitting diode (OLEO) display, have been widely used in various types of electronic products, because of their lighter weight, lower cost, higher energy efficiency, fast response, better color purity, and higher brightness and contrast ratio, etc.

As the display technology advances, Virtual Reality (VR) display technology is receiving more and more attention, VR technology, also known as immersive multimedia or computer-simulated reality technology, is a computer technology that replicates an environment, real or imagined, simulates a user's physical presence in the environment, and provides immersive experience. VR technology highly desires the display panel to have fast response, high pixels per inch (PPI, pixel density, i.e., the number of pixels per inch), and high refresh rate. In particular, fast response is a critical factor in improving the user experience.

To achieve the fast response desired by the VR technique, a substantially thin cell gap of the display panel is often required, which is realized b reducing the height or thickness of photo spacers (PS) in existing technologies. However, when the film thickness of the PS material is substantially thin, the PS material film may be broken when being coated on the substrate of the display panel.

The disclosed display panel and display device thereof are directed to solve one or more problems set forth above and other problems.

BRIEF SUMMARY OF THE DISCLOSURE

One aspect of the present disclosure provides a display panel. The display panel comprises an array substrate having an inner surface disposed with at least one first hole; a color film substrate arranged opposite to the array substrate; and a first photo spacer disposed between the array substrate and the color film substrate. The inner surface of the array substrate is arranged facing an inner surface of the color film substrate, and the first photo spacer is at least partially inserted into the at least one first hole disposed at the inner surface of the array substrate.

Another aspect of the present disclosure provides a display device including a display panel, wherein the display panel comprises an array substrate having an inner surface disposed with at least one first hole; a color film substrate arranged opposite to the array substrate; and a first photo spacer disposed between the array substrate and the color film substrate. The inner surface of the array substrate is arranged facing an inner surface of the color film substrate, and the first photo spacer is at least partially inserted into the at least one first hole disposed at the inner surface of the array substrate.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
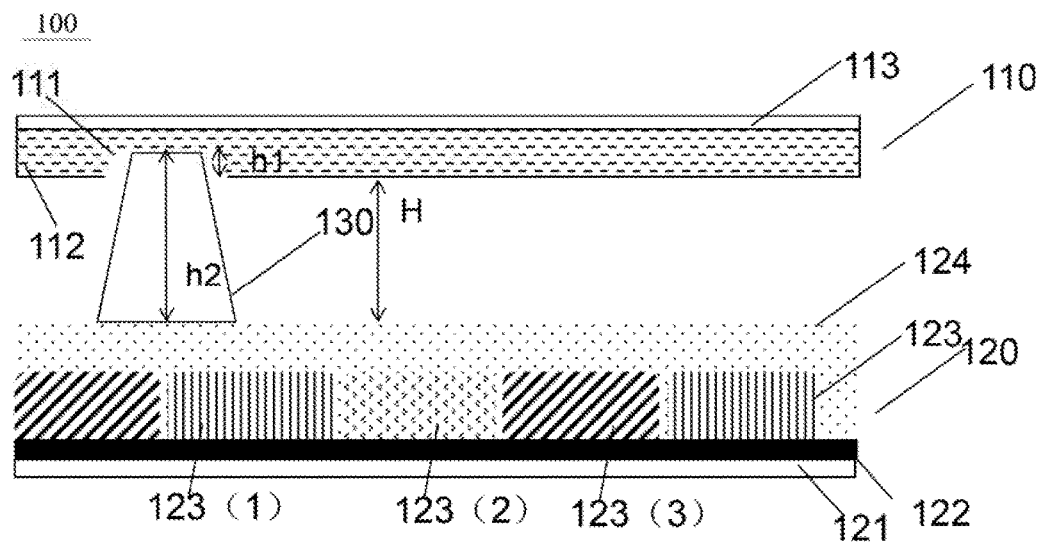
FIG. 1 illustrates a cross-sectional view of an exemplary display panel consistent with disclosed embodiments.

Reference will now be made in detail to exemplary embodiments of the invention, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The present disclosure provides an it improved display panel, in which at least one first hole is disposed at an inner surface of an array substrate, such that a substantially thin cell gap may be obtained without reducing the height of a photo spacer. Thus, the response of the display panel may be significantly improved, while the photo spacer film may not be broken during the fabrication.

The present disclosure first provides a display panel, which may comprise an array substrate having an inner surface disposed with at least one first hole, a color film substrate arranged opposite to the array substrate, and a first photo spacer disposed between the array substrate and the color film substrate. The first photo spacer (PS) may be at least partially inserted into the first hole on the array substrate.

FIG. 1 illustrates a cross-sectional view of an exemplary display panel 100 consistent with disclosed embodiments. As shown in FIG. 1, the display panel 100 may comprise an array substrate 110 having an inner surface disposed with at least one first bole 111, a color film substrate 120 arranged opposite to the array substrate 110, and a first photo spacer (PS) 130 disposed between the array substrate 110 and the color film substrate 120. The first photo spacer 111 may be at least partially inserted into the first hole 111 in the array substrate 110.

In particular, each of the array substrate 110 and the color film substrate 120 may have an inner surface and outer surface. The inner surface of the array substrate 110 may face the inner surface of the color film substrate 120. The first photo spacer (PS) 130 may be in contact with the array substrate 110 to maintain a certain cell gap between the array substrate 110 and the color film substrate 120. That is, assuming the top surface of the first photo spacer (PS) 130 is inserted towards the bottom surface of the first hole 111, then the top surface of the first photo spacer (PS) 130 may be in contact with the bottom surface of the first hole 111. In one embodiment, the first photo spacer (PS) 130 may be a primary photo spacer (MPS).

The disclosed display panel may be a liquid crystal display (LCD) panel, an organic light-emitting diode (OLED) display panel, a plasma display panel (PDP), a field emission display (FED) panel, a light-emitting diode (LED) display panel, a quantum dots (QDs) display panel, an electrophoretic display panel or other appropriate display panel capable of displaying videos and/or images.

In one embodiment, as shown in FIG. 1, the display panel may be an LCD panel. The array substrate 110 may further include a first transparent substrate 113 and a thin film transistor (TFT) driving layer 112. The TFT driving layer 112 may include a plurality of thin film transistors (TFTs), a plurality of pixel electrodes, and a first alignment film (not drawn in FIG. 1) formed on the first transparent substrate 113. The first transparent substrate 113 may be made of rigid transparent materials or flexible transparent materials. For example, the first transparent substrate 113 may be made of glass, or flexible transparent plastic, such as polyimide.

The TFT driving layer 112 may include a plurality of gate lines, a plurality of data lines, a plurality of TFTs, and a plurality of pixel electrodes. In particular, the gate lines and the data lines may be formed on the first transparent substrate 113, and a gate insulating layer may be formed between the gate lines and the data lines. The gate lines may intersect the data lines to define a plurality of unit areas. The TFTs may be disposed in the intersections of the data lines and gate lines, and the pixel electrodes may be disposed in the unit areas defined by the gate lines and the data lines.

Further, the TFT driving layer 112 may also include a plurality of storage capacitors each formed in an overlapped area of the gate line and the pixel electrode. The storage capacitor may maintain the current pixel voltage applied to the pixel electrode until a next pixel voltage is provided.

Each TFT may include a gate electrode connected to the gate line, a source electrode connected to the data line, a drain electrode connected to the pixel electrode, and an active layer formed on the gate electrode. A channel may be formed between the source electrode and the drain electrode.

The active layer may be overlapped with the data lines, the source electrode and the drain electrode. In certain embodiments, an ohmic contact layer may be formed on the active layer, and the ohmic contact layer may be in ohmic contact with the data lines, the source electrode, and the drain electrode. The active layer and the ohmic contact layer may define a semiconductor pattern.

In one embodiment, the storage capacitor may be disposed above the first photo spacer (PS) 130. In another embodiment, the first photo spacer (PS) 130 may be disposed under the TFTs of the array substrate 110.

In the TFT, the pixel electrode may be charged in response to the gate signal provided to the gate line and the pixel voltage signal provided to the data line. Thus, the pixel electrode may be connected to the drain of the TFT through the contact hole penetrating a passivation film. The pixel electrode may be provided with a potential different from the common electrode. That is, a potential difference may be formed between the pixel electrode and the common electrode, such that the liquid crystal molecules sandwiched between the array substrate 110 and the color film substrate 120 may be reoriented due to the dielectric anisotropy, and light emitted from the light source may be transmitted through the pixel electrode to the color film substrate 120.

The depth of the first hole 111, and the distance between the inner surface of the array substrate 110 and the inner surface of the color film substrate may vary according to various application scenarios. The distance between the inner surface of the array substrate 110 and the inner surface of the color film substrate 120 may be adjusted by adjusting the depth of the first hole 111.

In one embodiment, the depth h1 of the first hole 111 may be approximately $0 \leq h1 \leq 2.0$ μm, and the distance H between the inner surface of the array substrate 110 and the inner surface of the color film substrate 120 may be approximately $1.0 \ \mu m \leq H \leq 2.5$ μm. Thus, through at least partially inserting the first photo spacer (PS) 130 into the first hole 111 disposed at the inner surface of the array substrate 110, a substantially thin cell gap (e.g., $1.0 \ \mu m \leq H \leq 2.5$ μm) may be obtained without reducing the height of the first photo spacer (PS) 130, while the photo spacer (PS) film may not be broken during the fabrication.

The substantially thin cell gap may significantly improve the response speed of the display panel, which is highly desired for realizing VR. Accordingly, the display panel may be applied to the VR field to enhance the user experience.

When the height of the first photo spacer (PS) 130 is h2, the distance H between the inner surface of the array substrate 110 and the inner surface of the color film substrate 120 is $H=h2-h1$. The first hole 111 may be disposed at the inner surface of the array substrate 110 and the opening of the first hole 111 may be facing the upper portion the main photo spacer (MPS) 130, such that the upper portion of the main photo spacer (MPS) 130 may be inserted into the first hole 111. When the height of the main photo spacer (MPS) 130 reaches the technological limit, the substantially thin cell gap of the display panel 100 may be realized through adjusting the depth h1 of the first hole 111.

On the other hand, the color film substrate 120 may include a second transparent substrate 121, a black matrix 122 formed on the second transparent substrate 121 by exposure, and development, a pixel resin layer 123 formed on the black matrix 122, and a protective layer 124 or a common electrode 124 formed on the pixel resin layer 123 and the black matrix 122.

In one embodiment, when the display panel is a LCD panel working under a vertical electric field (e.g., a twisted nematic (TN) LCD panel), the common electrode 124 may be formed on the pixel resin layer 123. In another embodiment, when the display panel is a LCD panel working under a horizontal electric field (e.g., an in-plane Switching (IPS) LCD panel), the common electrode 124 may be formed on the array substrate 110, and the protective layer 124 may be formed on the black matrix 122 and the pixel resin layer 123. The protective layer 124 may be formed by a positive photoresist or negative photoresist accordingly to various application scenarios.

In the disclosed embodiments, the color film substrate 120 may further include a second alignment film (not drawn in FIG. 1) formed on the second transparent substrate 121. In the color film substrate 120, the black matrix 122 may be formed on the second transparent substrate 121, in particular, in a region of the second transparent substrate 121 corresponding to the gate lines, the data lines, and the TFTs disposed on the first transparent substrate 113. The black matrix 122 may also include a plurality of unit areas for disposing the pixel resin layer 123. The black matrix 122 may be able to prevent light leakage and absorb external light, thereby increasing the contrast ratio of the display panel 100.

The pixel resin layer 123 may include a plurality of pixel resin layers in different colors. In one embodiment, as shown in FIG. 1, the pixel resin layer 123 may include a red pixel resin layer 123(1), a green pixel resin layer 123(2), and a blue pixel resin layer 123(3). In another embodiment, the pixel resin layer 123 may also include a white pixel resin layer or pixel resin layers in other colors, which are not limited by the present disclosure.

Figure 10:
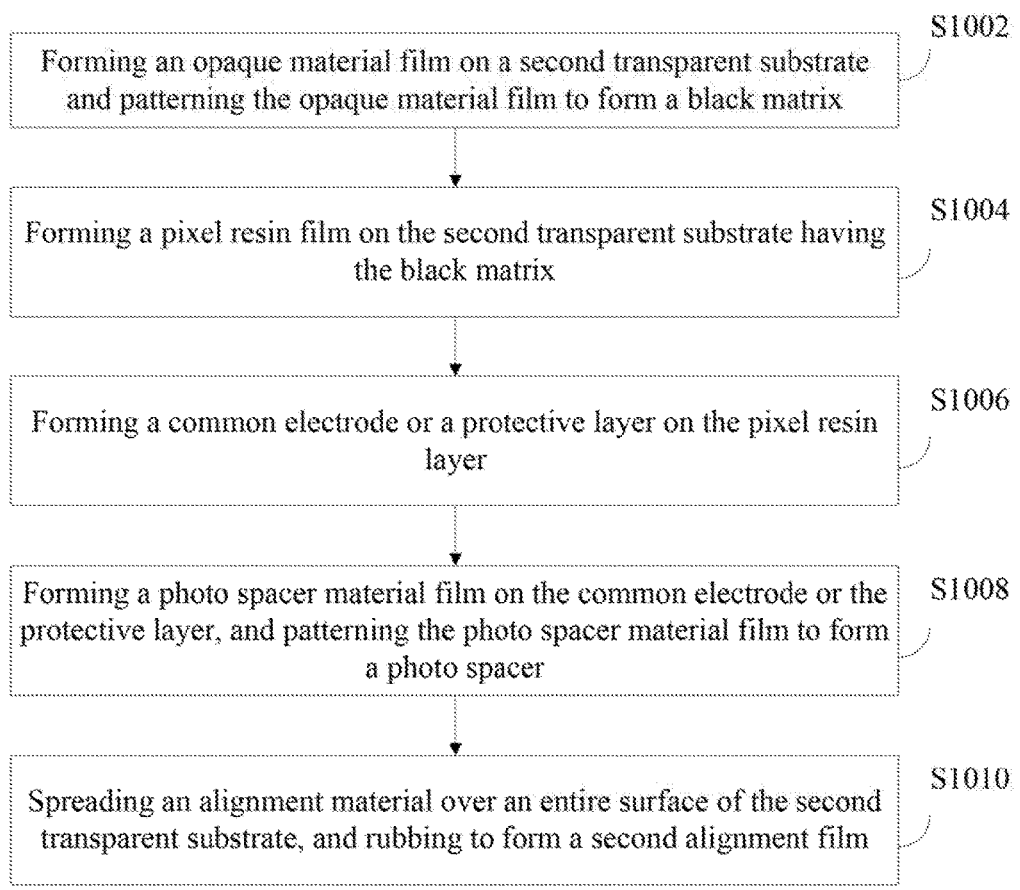
FIG. 10 illustrates a flow chart of forming an exemplary color film substrate in an exemplary display device consistent with disclosed embodiments.

FIG. 10 illustrates a flow chart of forming an exemplary color film substrate in an exemplary display device consistent with disclosed embodiments. As shown in FIG. 10, at the beginning, an opaque material film is formed on a second transparent substrate, and through adopting a mask, the opaque material film is patterned by a photolithography process and an etching process to form a black matrix (S1002). In particular, as shown in FIG. 1, the opaque material film may be formed on the second transparent substrate 121 by a deposition method such as sputtering. The opaque material film may be made of, for example, chromium (Cr), and an opaque resin, etc. That is, the black matrix 122 may be made of chromium (Cr), and an opaque resin, etc.

Returning to FIG. 10, after the black matrix is formed on the second transparent substrate, a pixel resin layer is formed on the second transparent substrate having the black matrix (S1004). The pixel resin layer may include a plurality of pixel resin layers in different colors. In one embodiment, as shown in FIG. 1, the pixel resin layer may include a red pixel resin layer 123(1), a green pixel resin layer 123(2), and a blue pixel resin layer 123(3).

In particular, to form the pixel resin layer is formed on the second transparent substrate having the black matrix, a red resin film is coated on the second transparent substrate having the black matrix and patterned by a photolithography process to form a red pixel resin layer. In particular, as shown in FIG. 1, the red resin film may be coated on the second transparent substrate 121 having the black matrix 122 and patterned by a photolithography process to form the red pixel resin layer 123(1). In the photolithography process, a photomask having a transparent area and an opaque region may be adopted, which may be aligned above the second transparent substrate 121.

After the red pixel resin layer on the second transparent substrate having the black matrix, a green resin film is coated on the second transparent substrate having the red pixel resin layer and patterned by a photolithography process to form a green pixel resin layer. In particular, as shown in FIG. 1, the blue resin film may be coated on the second transparent substrate 121 having the red pixel resin layer 123(1), and patterned by a photolithography process to form the green pixel resin layer 123(2). Similarly, in the photolithography process, a photomask having a transparent area and an opaque region may be adopted.

After the green pixel resin layer on the second transparent substrate having the black matrix, a blue resin film is coated on the second transparent substrate having the green pixel resin layer and patterned by a photolithography process to form a blue pixel resin layer. In particular, as shown in FIG. 1, the blue resin film may be coated on the second transparent substrate 121 having the green pixel resin layer 123(2), and patterned by a photolithography process to form the blue pixel resin layer 123(3). Similarly, in the photolithography process, a photomask having a transparent area and an opaque region may be adopted. Thus, the pixel resin layer 123 having the red pixel resin layer 123(1), the green pixel resin layer 123(2), and the blue pixel resin layer 123(3) may be formed on the second transparent substrate 121 having the black matrix 122.

Returning to FIG. 10, after the pixel resin layer is formed on the second transparent substrate having the black matrix, a common electrode or a protective layer is formed on the pixel resin layer (S1006). In one embodiment, as shown in FIG. 1, when the display panel is a TN LCD panel, the common electrode 124 may be formed on the pixel resin layer 123. In another embodiment, as shown in FIG. 1, when the display panel is an IPS LCD panel, the protective layer 124 instead of the common electrode may be thrilled on the pixel resin layer 123.

Returning to FIG. 10, after the common electrode or the protective layer is formed on the pixel resin layer, a photo spacer material film is formed on the common electrode or the protective layer, and patterned to form a photo spacer by a photolithography process and an etching process (S1008). In particular, as shown in FIG. 1, the photo spacer (PS) 130 may be formed on the common electrode 124 in the TN LCD panel or the protective layer in the IPS LCD panel. The shape and number of the photo spacer (PS) 130 shown in FIG. 1 is for illustrative purposes, and is not intended to limited the scope of the present disclosure.

In another embodiment, the common electrode or protective layer 124 may be formed after the first photo spacer (PS) 130 is formed. Thus, the first photo pacer 130 may be formed directly on the black matrix 122 and the pixel resin layer 123. In another embodiment, the common electrode or protective layer 124 may be formed between the black matrix 122 and the first photo spacer (PS) 130. In another embodiment, the common electrode or protective layer 124 may be formed between the pixel resin layer 123 and the first photo spacer (PS) 130.

Returning to FIG. 10, after the photo spacer is formed, an alignment material is spread over the entire surface of the second transparent substrate, and rubbed to form a second alignment film (S1010). In particular, the alignment material may include polyimide.

Figure 11:
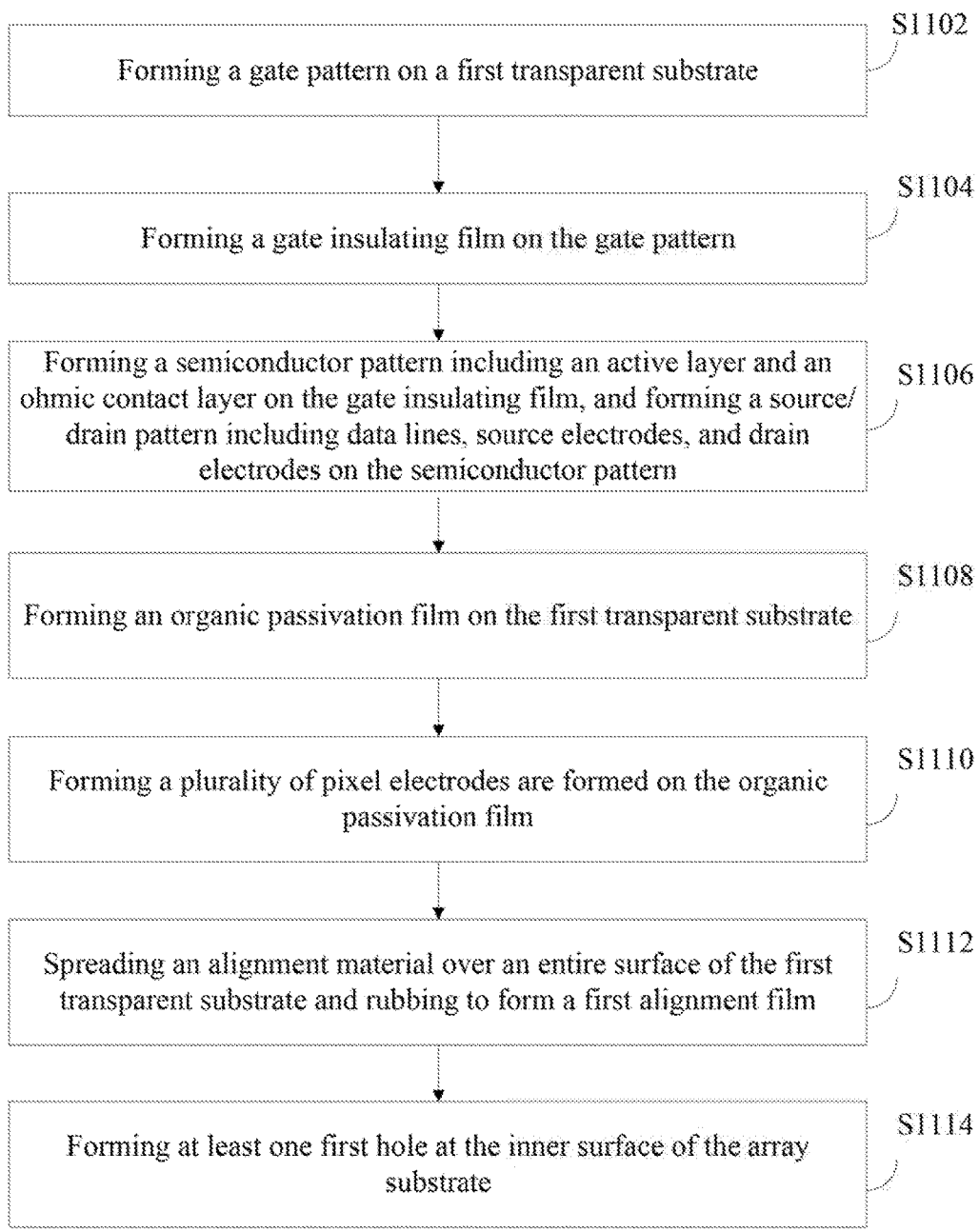
FIG. 11 illustrates a flow chart of forming an exemplary array substrate in an exemplary display device consistent with disclosed embodiments.

FIG. 11 illustrates a flow chart of forming an exemplary array substrate in an exemplary display device consistent with disclosed embodiments. As shown in FIG. 11, at the beginning, a gate pattern such as gate electrodes and gate lines are formed on a first transparent substrate by using a mask through a photolithography process and an etching process (S1102). In particular, as shown in FIG. 1, the gate pattern (not drawn in FIG. 1) may be formed on the first transparent substrate 113.

Returning to FIG. 11, after the gate pattern is formed, a gate insulating film is formed on the gate pattern (S1104). After the gate insulating film is formed, by using a mask through a photolithography process and an etching process, a semiconductor pattern including an active layer and an ohmic contact layer is formed on the gate insulating film, and a source/drain pattern including data lines, source electrodes, and drain electrodes formed on the semiconductor pattern (S1106). Accordingly, a plurality of TFTs may be formed.

After the TFTs are formed, an organic material is deposited on the entire surface of the first transparent substrate, and an organic passivation film having a contact hole exposing the drain electrode of the TFT is formed on the first transparent substrate (S1108). In particular, as shown in FIG. 1, the organic material (not drawn in FIG. 1) may be deposited on the entire surface of the first transparent substrate 113 and, accordingly, the organic passivation film (not drawn in FIG. 1) having a contact hole exposing the drain electrode of the TFT may be formed on the first transparent substrate 113.

Returning to FIG. 11, after the organic passivation film is formed on the first transparent substrate, a plurality of pixel electrodes are formed on the organic passivation film, in which a pixel electrode is brought into contact with the drain electrode of the TFT through the contact hole (S1110). After the pixel electrodes are formed on the organic passivation film, an alignment material is spread over the entire surface of the first transparent substrate, and rubbed to form a first alignment film (S1112). In particular, the alignment material may include polyimide, and the first alignment film may cover the pixel electrodes.

After the first alignment film is formed on the first transparent substrate, at least one first hole is formed at the inner surface of the array substrate by using a mask through a photolithography process and an etching process (S1114). A shown in FIG. 1, the at least one first hole 111 may be formed in the may substrate 110 and facing the upper portion the photo spacer (PS) 130 formed on the color film substrate 120. For example, the first hole 111 may be aligned with the upper portion the photo spacer (PS) 130. Thus, when the array substrate 110 is attached to the color film substrate 120, the upper portion of the photo spacer (PS) 130 may be inserted into the first hole 111 formed in the array substrate 110. That is, the photo spacer (PS) 130 may be in contact with the array substrate 110.

In the disclosed embodiments, the first hole may be disposed on the inner surface of the array substrate, such that a substantially thin cell gap of the display panel may be achieved through adjusting the depth of the first hole, while the height of the first photo spacer may not have to be reduced. On one hand, the substantially thin cell gap may significantly improve the response speed of the display panel, enabling the application of the display panel in the VR field and other application fields requiring fast response may be enabled. On the other hand, the photo spacer film may not be broken during the fabrication.

Figure 2:
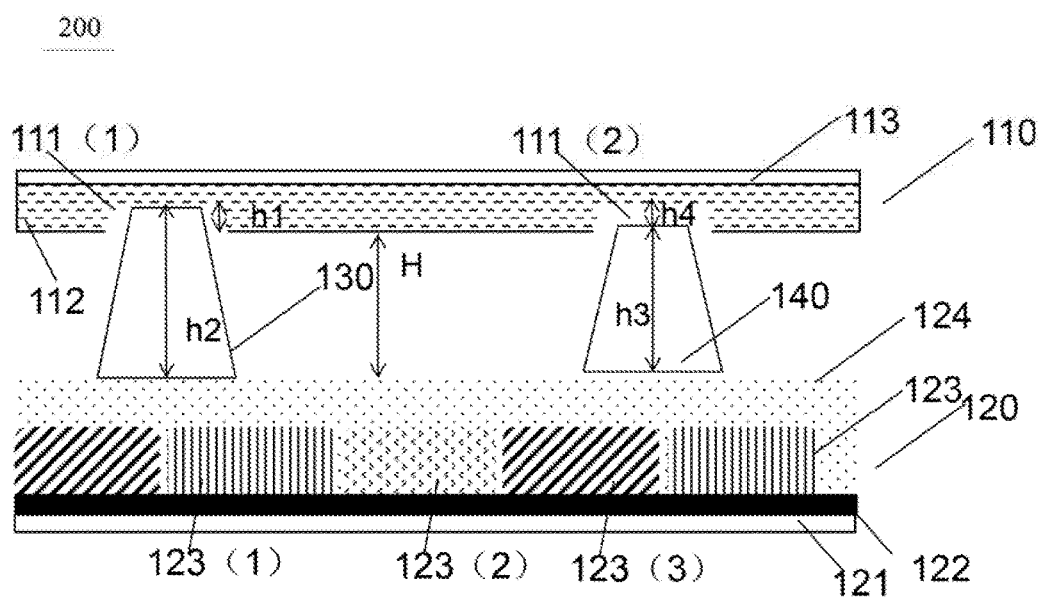
FIG. 2 illustrates a cross-sectional view of another exemplary display panel consistent with disclosed embodiments.

FIG. 2 illustrates a cross-sectional view of another exemplary display panel 200 consistent with disclosed embodiments. The same reference numbers will be used throughout the drawings to refer to the same or like parts, and a detailed description thereof may be omitted. The similarities between FIG. 1 and FIG. 2 are not repeated here, while certain differences may be explained.

As shown in FIG. 2, in addition to the first photo spacer (PS) 130 which is at least partially inserted into a first hole 111(1) formed at the inner surface of the array substrate 110, the display panel 200 may further include a second photo spacer (PS) 140 disposed between the array substrate 110 and the color film substrate 120. In particular, the second photo spacer (PS) 140 may be partially inserted into a first hole 111(2) formed on the inner surface of the array substrate 110. Without an external pressure, the second photo spacer (PS) 140 may be separated from the first hole 111(2) by a predetermined distance h4 in a direction perpendicular to the array substrate 110 and the color film substrate 120. That is, the second photo spacer (PS) 140 may be not in contact with the array substrate 110.

For example, in one embodiment, as shown in FIG. 2, the second photo spacer (PS) 140 may be partially inserted in the first hole 111(2), provided that the top surface of the second photo spacer (PS) 140 is inserted towards the bottom surface of the first hole 111(2), the distance between the top surface of the second photo spacer (PS) 140 and the bottom surface of the first hole 111(2) may be configured to be the predetermined distance h4.

When the display panel 200 is not applied with an external pressure, the predetermined distance h4 may be greater than 0. That is, the second photo spacer (PS) 140 may be not directly in contact with the array substrate 110. When the display panel 200 is applied with an external pressure, the second photo spacer (PS) 140 may become in contact with the array substrate 110, helping the first photo spacer (PS) 130 to maintain the cell gap of the display panel 200.

In a LCD panel, the optical transmittance of the LCD panel is often controlled by applying an electric field to a liquid crystal layer, thereby displaying images. Accordingly, the LCD panel may comprise the array substrate 110 and the color film substrate 120 arranged opposite to the array substrate 110, a first photo spacer (PS) 130 disposed between the array substrate 110 and the color film substrate 120 for maintaining a certain cell gap of the LCD display, and liquid crystal materials (i.e., a liquid crystal layer) filled in the gap between the array substrate 110 and the color film substrate 120.

Because the liquid crystal material disposed in the gap may expand when subjected to a high temperature, the cell gap may vary accordingly. That is, the reliability of maintaining the cell gap or the cell gap stability may be reduced. To solve this problem, a double-photo-spacer structure (e.g., the first photo spacer 130 and the second photo spacer 140) may be adopted. The first photo spacer (PS) 130 may be a main photo spacer (MPS), while the second photo spacer (PS) 140 may be a secondary photo spacer (SPS).

In the disclosed embodiments, the first hole 111(1) and the first hole 111(2) may be disposed at the inner surface of the array substrate 110. The first photo spacer (PS) 130 may be partially inserted into the first hole 111(1) and in contact with the array substrate 110. Meanwhile, the second photo spacer (PS) 140 may be disposed in correspondence to the first hole 111(2), such that the second photo spacer (PS) 140 may be partially inserted into the first hole 111(2). However, a substantially narrow gap may be formed between the second photo spacer (PS) 140 and the array substrate 110. That is, the second photo spacer (PS) 140 may be not in contact with the array substrate 110. Thus, the defects caused by the expansion of the liquid crystal materials may be effectively suppressed, and the stability of the cell gap may be improved.

In one embodiment, the first photo spacer (PS) 130 may be disposed in an area overlapped with the storage capacitor, and the second photo spacer (PS) 140 may be disposed in an area overlapped the gate line, which is not limited by the present disclosure.

Further, the height of the second photo spacer (PS) 140 is denoted by h3. In one embodiment, as shown in FIG. 2, the height h3 of the second photo spacer (PS) 140 may be different from the height h2 of the first photo spacer (PS) 130, i.e., h2 is not equal to h3, where h2 may be larger than h3.

Figure 3:
FIG. 3 illustrates a cross-sectional view of an exemplary first hole consistent with disclosed embodiments.
Figure 3:
Figure 3:

The shape of the first hole 111 disposed at the inner surface of the array substrate 110 may vary according to various application scenarios. FIG. 3 illustrates a cross-sectional view of an exemplary first hole consistent with disclosed embodiments. As shown in FIG. 3, the first hole may have a cross-section in a circular shape, an oval shape, and a square shape.

Further, the first hole may have any desired cross-sectional shape. The first holes disposed at the inner surface of the array substrate may have the same cross-sectional shape or different cross-sectional shapes. In the disclosed embodiments, the first hole may have the circular cross-sectional shape, and all the first holes have the same cross-sectional shape, which is for illustrate purposes and is not intended to limit the scope of the present disclosure.

Figure 4:
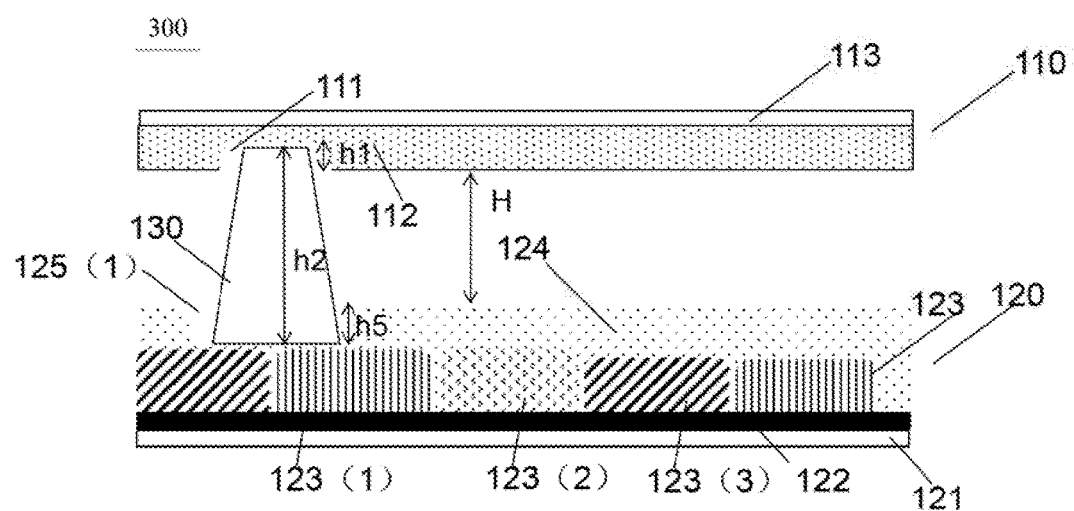
FIG. 4 illustrates a cross-sectional view of another exemplary display panel consistent with disclosed embodiments.

FIG. 4 illustrates a cross-sectional view of another exemplary display panel 300 consistent with disclosed embodiments. The similarities between FIG. 1 and FIG. 4 are not repeated here, while certain differences may be explained.

A shown in FIG. 4, compared to the display panel 100 shown in FIG. 1, the display panel 300 shown in FIG. 4 may further include at least one second hole 125(1), which may be disposed at the inner surface of the color film substrate 120. The first photo spacer (PS) 130 may be partially inserted in the second hole 125(1) disposed at the color film substrate 120. In one embodiment, as shown in FIG. 4, the lower portion of the first photo spacer (PS) 130 may be partially inserted in the second hole 125(1) disposed at the color film substrate 120.

The depth of the second hole 125(1) is denoted by h5. The distance between the inner surface of the array substrate 110 and the inner surface of the color film substrate 120 may be, expressed as H=h2 (the height of the first photo spacer (PS) 130)–h1 (the depth of the first hole 111)–h5 (the depth of the second hole 125(1)).

The first hole 111 may be disposed in the array substrate 110 and facing the upper portion the main photo spacer (MPS) 130, such that the upper portion of the main photo spacer (MPS) 130 may be inserted into the first hole 111. Meanwhile, the second hole 125(1) may be disposed at the protective layer or the common electrode on the color film substrate 120 and facing the lower portion the main photo spacer (MPS) 130, such that the lower portion of the main photo spacer (MPS) 130 may be inserted into the second hole 125(1). When the height of the main photo spacer (MPS) 130 reaches the technological limit, the substantially thin cell gap of the display panel 300 may be realized through adjusting the depth h1 of the first hole 111 and the depth h5 of the second hole 125(1).

Further, in one embodiment, as shown in FIG. 4, the depth h5 of the second hole 125(1) may be smaller than or equal to the thickness of the protective layer 124 or the thickness of the common electrode 124. That is, the second photo spacer (PS) 130 may be not directly in contact with the pixel resin layer 123 on the color film substrate 120. In another embodiment, according to various application scenarios, the depth h5 of the second hole 125(1) may be changed by adjusting the exposure time or the exposure amount, such that the depth of the second hole 125(1) may be greater than the thickness of the protective layer 124 or the thickness of the common electrode 124.

Similar to the first hole shown in FIG. 3, the cross-sectional shape of the second hole disposed on the inner surface of the color film substrate may vary according to various application scenarios. For example, the second hole may have a cross-section in a circular shape, an oval shape, and a square shape, etc. Further, the second hole may have any desired cross-sectional shape. When a plurality of second holes are disposed at the inner surface of the color film substrate, the second holes may have the same cross-sectional shape or different cross-sectional shapes. In the disclosed embodiments, the second hole may have the circular cross-sectional shape, which is for illustrate purposes and is not intended to limit the scope of the present disclosure.

Figure 5:
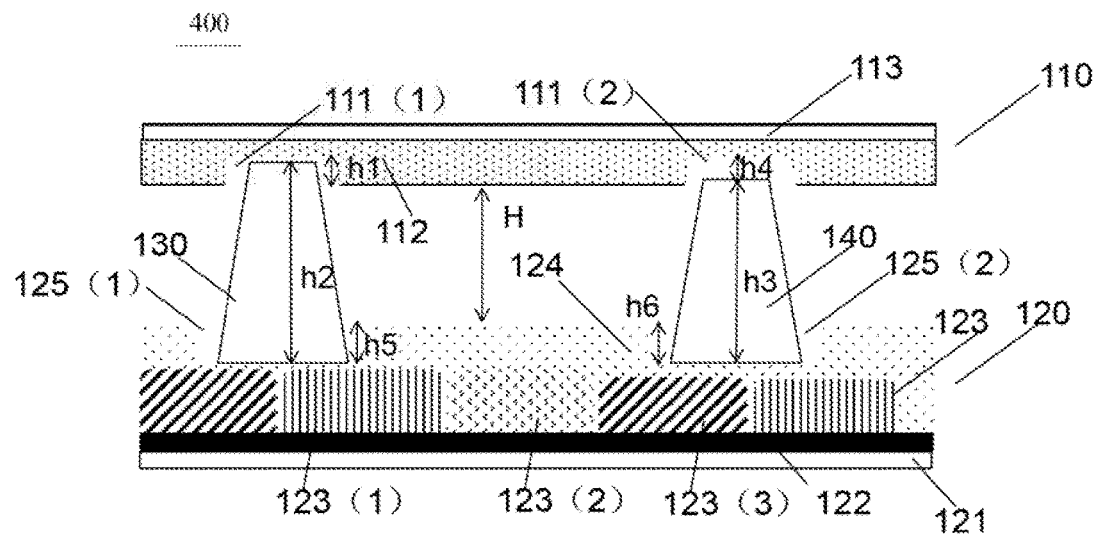
FIG. 5 illustrates a cross-sectional view of another exemplary display panel consistent with disclosed embodiments.

FIG. 5 illustrates a cross-sectional view of another exemplary display panel 400 consistent with disclosed embodiments. The similarities between FIG. 5 and FIG. 4 are not repeated here, while certain differences may be explained.

A shown in FIG. 5, compared to the display panel 300 shown in FIG. 4, the display panel 400 shown in FIG. 5 may further include a second photo spacer (PS) 140 disposed between the array substrate 110 and the color film substrate 120, and the second photo spacer (PS) 140 may be partially inserted into a second hole 125(2) formed at the inner surface of the array substrate 110. In one embodiment, as shown in FIG. 5, one end (e.g., the lower end or the lower portion) of the second photo spacer (PS) 140 may be partially inserted in the second hole 125(2).

The depth of the second hole 125(2) is h6. In one embodiment, the depth h5 of the second hole 125(1) may be equal to the depth h6 of the second hole 125(2). In another embodiment, the depth h5 of the second hole 125(1) may be not equal to the depth h6 of the second hole 125(2).

In one embodiment, as shown in FIG. 5, the other end (e.g., the upper end or the upper portion) of the second photo spacer (PS) 140 may be also partially inserted into the first hole 111(2) formed at the array substrate 110. Without an external pressure, the second photo spacer (PS) 140 may be separated from the first hole 111(2) by a predetermined distance h4 in a direction perpendicular to the array substrate 110 and the color film substrate 120. That is, the second photo spacer (PS) 140 may be not in contact with the array substrate 110.

In another embodiment, the other end (e.g., the upper end or the upper portion) of the second photo spacer (PS) 140 may be not inserted into the first hole 111(2) formed at the array substrate 110.

Figure 6:
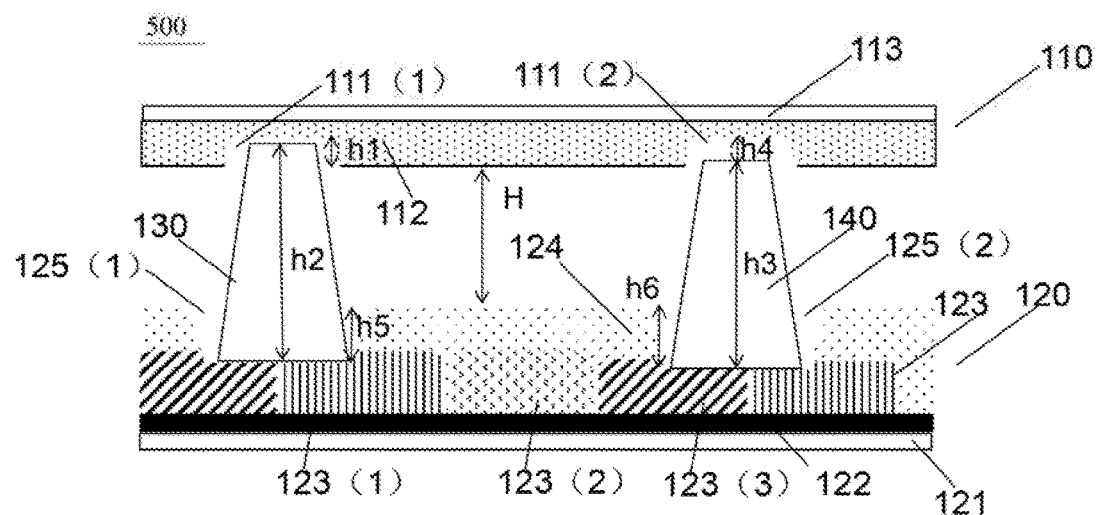
FIG. 6 illustrates a cross-sectional view of another exemplary display panel consistent with disclosed embodiments.

FIG. 6 illustrates a cross-sectional view of another exemplary display panel 500 consistent with disclosed embodiments. The similarities between FIG. 5 and FIG. 6 are not repeated here, while certain differences may be explained.

A shown in FIG. 6, compared to the display panel 400 shown in FIG. 5, in the display panel 500 shown in FIG. 6, the depth of each second hole (125(1) and 125(2)) may be larger than the thickness of the protective layer 124 or the thickness of the common electrode 124, and the second holes 125(1) and 125(2) may be formed directly on the black matrix 122 and the pixel resin layer 123.

Further, the depth h5 of the second hole 125(1) where the first photo spacer (PS) 130 is inserted may be not equal to the depth of the second hole 125(2) where the second photo spacer (PS) 140 is inserted.

Figure 7:
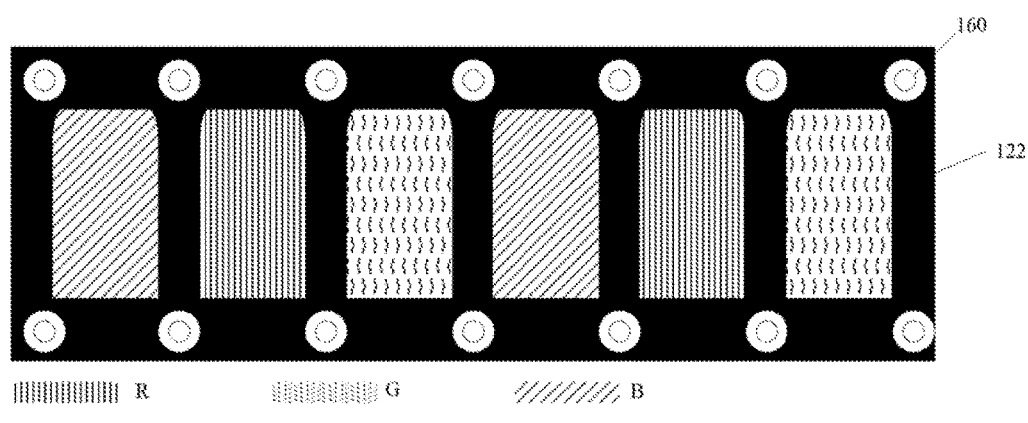
FIG. 7 illustrates a top view of an exemplary display panel consistent with disclosed embodiments.

FIG. 7 illustrates a top view of an exemplary display panel consistent with disclosed embodiments. As shown in FIG. 7, the array substrate 110 may comprise a plurality of sub-pixels. In one embodiment, as shown in FIG. 7, the array substrate 110 may include red sub-pixels R, green sub-pixels G, and blue sub-pixels B, which is for illustrate purposes and is not intended to limit the scope of the present disclosure.

Further, each sub-pixel may be provided with one first photo spacer (PS) 130 or one second photo spacer (PS) 140 (160 in FIG. 7 denotes any of the first photo spacer or the second photo spacer). The orthogonal projection of each first photo spacer and each second photo spacer onto the array substrate may fall within the black matrix 122.

Currently, a thin film transistor liquid crystal display (TFT-LCD) panel is formed by attaching the color film substrate 120 to the array substrate 110 arranged opposite to the color film substrate 120, and the color film substrate 120 provides colors for the TFT-LCD. As the liquid crystal display technology advances, pixels per inch (PPI) is getting higher and higher, and the pixel size is getting more and more smaller. To achieve a uniform surface pressure when the TFT-LCD is subjected to a vertical pressure, each sub-pixel is highly desired to correspond to one photo spacer.

Figure 8:
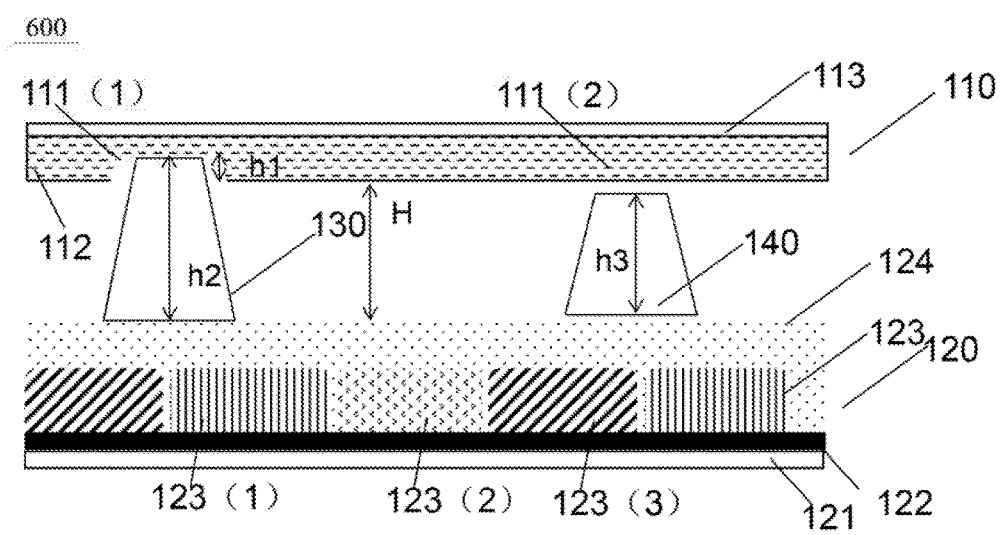
FIG. 8 illustrates a cross-sectional view of another exemplary display panel consistent with disclosed embodiments.

FIG. 8 illustrates a cross-sectional view of another exemplary display panel 600 consistent with disclosed embodiments. The similarities between FIG. 8 and FIG. 1 are not repeated here, while certain differences may be explained.

A shown in FIG. 8, compared to the display panel 100 shown in FIG. 1, the display panel 600 may further include a second photo spacer (PS) 140 disposed between the array substrate 110 and the color film substrate 120. In particular, the first photo spacer (PS) 130 may be in direct contact with the array substrate 110 and the color film substrate 120. The second photo spacer (PS) 140 may be in contact with the array substrate 110 when being applied with an external pressure.

Figure 9:
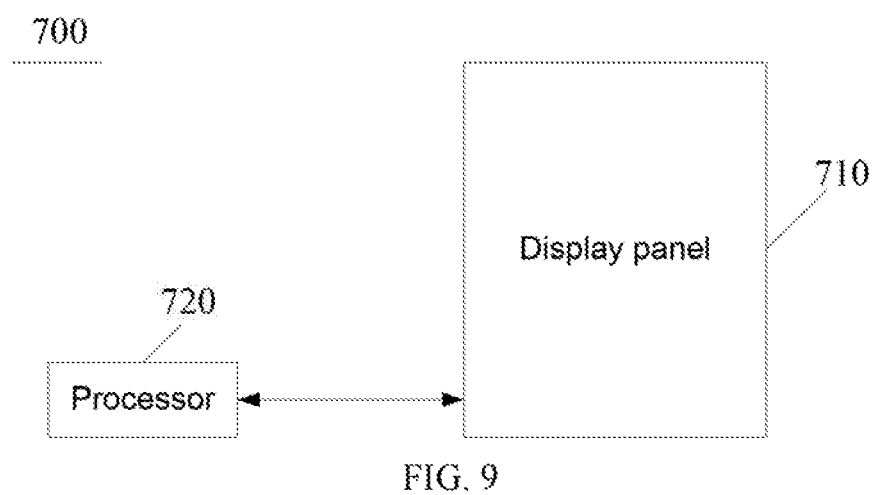
FIG. 9 illustrates a block diagram of an exemplary display device consistent with disclosed embodiments.

FIG. 9 illustrates a block diagram of an exemplary display device 700 consistent with disclosed embodiments. As shown in FIG. 9, the display device 700 may comprise a display panel 710 and a processor 720. The display panel 710 may include any one of the disclosed display panels. The details of the display panels 710 have been already desired, which will not be repeated here.

For example, the display device 700 may be a tablet, a TV, a smartphone, a notebook, and a smartwatch including any of the disclosed display panel 710, etc. Further, the display device 700 may be any appropriate typo of content-presentation devices including any of the disclosed display panel 710. The disclosed display device may also exhibit same advantages as the disclosed display panel.

The disclosed display device may be a cell phone, a tablet, a monitor, and a smart wearable display device, etc. Any display device comprising any of the disclosed display panels will fall within the scope of the present disclosure.

In the disclosed embodiments, through disposing at least one hole at the inner surface of the array substrate, or disposing at least one hole at the inner surface of the array substrate and at least one hole at the inner surface of the color film substrate, a photo spacer (PS) may be at least partially inserted into the at least one hole at the inner surface of the array substrate, or inserted into the at least one bole at the inner surface of the array substrate and the at least one hole at the inner surface of the color film substrate. Thus, a substantially thin cell gap may be obtained without reducing the thickness of the photo spacer (PS) and, accordingly, the response speed of the display panel may be significantly in proved. The display panel with a substantially thin cell gap may greatly enhance the user experience in virtual reality (VR) applications.

Moreover, through adopting a double-photo-spacer structure (i.e., a main photo spacer and a secondary photo spacer), the cell gap of the display panel after attaching the array substrate to the color film substrate may have an improved stability.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A display panel, comprising:
    an array substrate having an inner surface disposed with at least one first hole, wherein the array substrate further includes a first transparent substrate and a thin film transistor (TFT) driving layer;
    a color film substrate arranged opposite to the array substrate, wherein the color film substrate further includes a second transparent substrate, a black matrix formed on the second transparent substrate, a pixel resin layer formed on the black matrix, and a protective layer or a common electrode formed on the pixel resin layer and the black matrix;
    at least one second hole and one third hole disposed at an inner surface of the color film substrate; and
    a first photo spacer and a second photo spacer disposed between the array substrate and the color film substrate,
    wherein the inner surface of the array substrate is arranged facing the inner surface of the color film substrate,
    the first photo spacer is at least partially inserted into the at least one first hole disposed at the inner surface of the array substrate,
    the first photo spacer is at least partially inserted into the at least one second hole disposed at the inner surface of the color film substrate,
    the second photo spacer is partially inserted into the at least one third hole disposed at the inner surface of the color film substrate,
    a height of the first photo spacer is larger than a height of the second photo spacer,
    without an external pressure, the second photo spacer is separated from a bottom of the at least one third hole by a predetermined distance in a direction perpendicular to the array substrate and the color film substrate,
    the at least one second hole is an opening throughout the protective layer or the common electrode in a direction perpendicular to the color film substrate,
    the first photo spacer, having indirect contact with the black matrix, overlaps with the pixel resin layer, and
    an orthogonal projection of the pixel resin layer on the second transparent substrate is surrounded by an orthogonal projection of the black matrix on the second transparent substrate.

2. The display panel according to claim 1, wherein:
    a distance H between the inner surface of the array substrate and the inner surface of the color film substrate is approximately 1.0 µm≤H≤2.5 µm.

3. The display panel according to claim 1, wherein:
a depth h1 of the at least one first hole is approximately $0 \leq h1 \leq 2.0$ μm.

4. The display panel according to claim 1, further including:
at least one fourth hole disposed at the inner surface of the array substrate,
wherein the second photo spacer is partially inserted into the at least one fourth hole disposed at the inner surface of the array substrate,
without an external pressure, the second photo spacer is separated from the at least one fourth hole by a predetermined distance in a direction perpendicular to the array substrate and the color film substrate.

5. The display panel according to claim 1, wherein:
the at least one first hole has a cross-section in a circular shape, an oval shape, and a square shape.

6. The display panel according to claim 1, further including:
a second photo spacer disposed between the array substrate and the color film substrate, and
at least one third hole formed at the inner surface of the color film substrate,
wherein the second photo spacer is partially inserted in the at least one third hole disposed at the inner surface of the color film substrate.

7. The display panel according to claim 1, wherein:
a depth of the at least one second hole is smaller than or equal to a thickness of the protective layer or the common electrode.

8. The display panel according to claim 1, wherein:
a depth of the at least one second hole is larger than a thickness of the protective layer or the common electrode.

9. The display panel according to claim 1, wherein:
the at least one second hole has a cross-section in a circular shape, an oval shape, and a square shape.

10. The display panel according to claim 1, wherein:
the pixel resin layer includes a red pixel resin layer, a blue pixel resin layer, and a green pixel resin layer.

11. The display panel according to claim 1, wherein the array substrate further includes:
a plurality of sub-pixels,
wherein each sub-pixel is provided with one first photo spacer or one second photo spacer, and
an orthogonal projection of the first photo spacer and the second photo spacer onto the array substrate falls within the black matrix.

12. The display panel according to claim 1, wherein:
the first photo spacer is in contact with both the array substrate and the color film substrate; and
the second photo spacer is in contact with the array substrate under an external pressure.

13. The display panel according to claim 1, wherein:
the TFT driving layer further includes a plurality of storage capacitors, and the first photo spacer is disposed in an area overlapped with the plurality of storage capacitors.

14. A display device comprises a display panel, wherein the display panel comprises:
an array substrate having an inner surface disposed with at least one first hole, wherein the array substrate further includes a first transparent substrate and a thin film transistor (TFT) driving layer;
a color film substrate arranged opposite to the array substrate, wherein the color film substrate further includes a second transparent substrate, a black matrix formed on the second transparent substrate, a pixel resin layer formed on the black matrix, and a protective layer or a common electrode formed on the pixel resin layer and the black matrix;
at least one second hole and one third hold disposed at an inner surface of the color film substrate; and
a first photo spacer and a second photo spacer disposed between the array substrate and the color film substrate,
wherein the inner surface of the array substrate is arranged facing the inner surface of the color film substrate,
the first photo spacer is at least partially inserted into the at least one first hole disposed at the inner surface of the array substrate,
the first photo spacer is at least partially inserted into the at least one second hole disposed at the inner surface of the color film substrate,
the second photo spacer is partially inserted into the at least one third hole disposed at the inner surface of the color film substrate,
a height of the first photo spacer is larger than a height of the second photo spacer,
without an external pressure, the second photo spacer is separated from a bottom of the at least one third hole by a predetermined distance in a direction perpendicular to the array substrate and the color film substrate,
the at least one second hole is an opening throughout the protective layer or the common electrode in a direction perpendicular to the color film substrate,
the first photo spacer, having indirect contact with the black matrix, overlaps with the pixel resin layer, and
an orthogonal projection of the pixel resin layer on the second transparent substrate is within an orthogonal projection of the black matrix on the second transparent substrate.

15. The display device according to claim 14, wherein:
a distance H between the inner surface of the array substrate and the inner surface of the color film substrate is approximately $1.0\ \mu m \leq H \leq 2.5\ \mu m$; and
a depth h1 of the at least one first hole is approximately $0 \leq h1 \leq 2.0$ μm.

16. The display device according to claim 14, wherein:
the first photo spacer is in contact with both the array substrate and the color film substrate;
the second photo spacer is partially inserted in a fourth hole disposed at the inner surface of the array substrate,
without an external pressure, the second photo spacer is separated from the fourth hole by a predetermined distance in a direction perpendicular to the array substrate and the color film substrate, and
the second photo spacer is in contract with the array substrate under an external pressure.

* * * * *